United States Patent Office 3,465,033
Patented Sept. 2, 1969

3,465,033
METHOD FOR PURIFYING SALTS OF AMINOSULFONIC ACID CONDENSATION PRODUCTS
Robert M. Lincoln, Moylan, and Joseph A. Meyers III, Springfield, Pa., assignors to Atlantic Richfield Company, Philadelphia, Pa., a corporation of Pennsylvania
No Drawing. Filed Mar. 11, 1968, Ser. No. 711,924
Int. Cl. C07c 143/14
U.S. Cl. 260—513    5 Claims

ABSTRACT OF THE DISCLOSURE

Method for purifying aminosulfonic acid condensation products obtained by condensing a long chain epoxyalkane or monohaloalkane with an alkali metal or ammonium salt of an aminoalkyl sulfonic acid or an N-substituted aminoalkyl sulfonic acid, by adding carbon dioxide to an aqueous solution of the salt of the condensation product to precipitate the acid form, separating the acid form from the aqueous phase, washing the precipitate to remove impurities and reconverting the acid form of the condensation product to the salt.

BACKGROUND OF THE INVENTION

Field of the invention

This invention relates to a method for purifying alkali metal or ammonium salts of aminosulfonic acid condensation products, in particular those produced by condensing a long chain epoxyalkane or monohaloalkane with an alkali metal or ammonium salt of an aminoalkyl sulfonic acid or an N-substituted aminoalkyl sulfonic acid.

Description of the prior art

Gaertner, 3,084,187 (1963), discloses a broad group of substituted aminoalkyl sulfonic acids and the alkali metal and ammonium salts thereof. It is shown in this patent that an epoxyalkane or a haloalkanol can be condensed with an alkali metal or ammonium salt of an aminoalkyl sulfonic acid or an N-alkyl-aminoalkyl sulfonic acid to produce the corresponding hydroxy-substituted condensation product.

A number of recent patents disclose the production of long chain epoxyalkanes by reacting an olefin with an organic hydroperoxide in the presence of a molybdenum-containing catalyst. The production of chlorinated alkanes and chlorinated alkanols are processes well known in the prior art and the former is practiced commercially.

When these compounds in crude form are condensed with aminoalkyl or N-substituted aminoalkyl sulfonic acid salts the condensation products are somewhat colored and are not suitable for use in detergent compositions. If the epoxyalkanes or haloalkanes are completely purified prior to condensation, the condensation products are white but such purification is tedious and completely uneconomical.

SUMMARY OF THE INVENTION

In accordance with this invention the condensation product obtained by reacting an alkali metal or ammonium salt of an aminoalkyl sulfonic acid or an N-substituted aminoalkyl sulfonic acid with a long chain epoxyalkane or a haloalkane including hydroxy-substituted haloalkanes is purified to remove color bodies by adding carbon dioxide to an aqueous solution of the condensation product in an amount sufficient to lower the pH to the range corresponding to that of an aqueous carbonic acid solution. The precipitate thus obtained consisting of the acid form of the condensation product is separated from the aqueous solution, washed with water and thereafter reconverted to the desired alkali metal or ammonium salt.

It is an object of this invention therefore to provide a method for the purification of alkali metal or ammonium salts of aminosulfonic acid condensation products.

It is another object of this invention to provide a method for the purification of condensation products obtained by condensing a long chain epoxyalkane with an alkali metal or ammonium salt of an aminoalkyl sulfonic acid or an N-substituted aminoalkyl sulfonic acid.

It is another object of this invention to provide a method for purifying condensation products obtained by condensing a haloalkane with an alkali metal or ammonium salt of an aminoalkyl sulfonic acid or an N-substituted aminoalkyl sulfonic acid.

It is another object of this invention to provide a method for the purification of an alkali metal or ammonium salt of an aminosulfonic acid condensation product by converting the salt to the acid form utilizing carbon dioxide, water washing the acid form and thereafter reconverting the acid form to the desired salt.

Other objects of this invention will be apparent from the description of the preferred embodiments and from the claims.

DESCRIPTION OF THE PREFERRED EMBODIMENTS

The condensation products which can be purified by the method of this invention have the formula

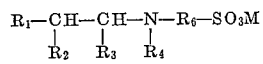

wherein $R_1$ is an alkyl radical having from 6 to 18 carbon atoms, $R_2$ is hydrogen or a hydroxyl radical, $R_3$ is hydrogen or an alkyl radical having from 1 to 12 carbon atoms, $R_4$ is a radical selected from the group consisting of an alkyl radical having from 1 to 20 carbon atoms and a radical having the formula

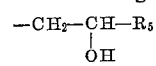

wherein $R_5$ is methyl, ethyl or propyl, $R_6$ is an alkylene radical having from 1 to 6 carbon atoms and M is ammonium or alkali metal.

Compounds wherein the $R_2$ is hydroxyl are produced by reacting a $C_8$ to $C_{20}$ epoxyalkane with the desired salt of the aminoalkyl sulfonic acid or N-substituted aminoalkyl sulfonic acid. Compounds wherein the $R_2$ is hydrogen are produced by reacting the desired haloalkane with the desired salt of the aminoalkyl sulfonic acid or N-substituted alkyl sulfonic acid. If $R_4$ is a radical having the formula

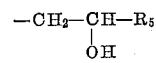

it is preferably prepared by reacting 1,2-epoxypropane, 1,2-epoxybutane or 1,2-epoxypentane with the salt of the aminoalkyl sulfonic acid. The N-substituted aminoalkyl sulfonic acid salts produced by this condensation process is thereafter reacted either with the epoxyalkane or the haloalkane to give the desired condensation product.

The crude long chain epoxyalkanes are produced by reacting an olefin having from 8 to 20 carbon atoms in the molecule preferably straight chain and preferably alpha-olefins with an organic hydroperoxide preferably tertiary-butyl hydroperoxide in the presence of a molybdenum-containing catalyst, for example, molybdenum hexacarbonyl. Although the alpha-olefins, i.e., those with a terminal double bond are preferred the internal olefins also can be used satisfactorily. The epoxidation reaction is preferably carried out in the presence of a solvent such as tertiary-butyl alcohol at temperatures in the range of from 50° C. to 200° C. with a mole ratio of olefin to organic hydroperoxide of 1:1 to 10:1.

The amounts of catalyst can range from 50 to 500 p.p.m. of molybdenum based on the total rate of reaction mixture and reaction times of from 15 minutes to 2 hours are generally sufficient. Any method for the preparation of the epoxyalkanes can be used, however, the method described being merely a convenient one.

The haloalkanes are preferably either the chloroalkanes or bromoalkanes. These can be produced in accordance with conventional methods, for example, the chloroalkanes can be produced by reacting an alkane fraction having from about 8 to 20 carbon atoms with chlorine at conversions below about 30 percent, preferably from about 15 to 20 percent in order to obtain predominantly monochlorides with minimum amounts of di- and polychlorides. This method produces both the primary chlorides and secondary chlorides. The primary chlorides are somewhat more preferred but either can be used to make the condensation products with the amino sulfonic acid salts.

The crude mixture of alkanes and monohaloalkanes such as monochloroalkanes can be employed in producing the condensation product with the alkali metal or ammonium salts of the aminoalkyl or N-substituted aminoalkyl sulfonic acids. Preferably, however, the alkanes and monohaloalkanes are partially separated, for example, by distillation to obtain a fraction of increased monohaloalkane content.

The method of producing the monohaloalkanes like the method of producing the epoxyalkanes is not material to the present invention.

The condensation of the epoxyalkane with the salt of the aminoalkyl sulfonic acid or with the salt of the N-substituted aminoalkane sulfonic acid is carried out preferably by heating the epoxyalkane with the aminosulfonic acid salt in an aqueous solution at elevated temperatures, for example, from 80° C. to 120° C. for times ranging from 1 to 6 hours.

The condensation of the haloalkane with the salt of the aminoalkyl sulfonic acid or the salt of the N-substituted aminoalkyl sulfonic acid can be carried out in the presence of water when the haloalkane is a primary substituted compound. If the haloalkane is a secondary halide it is preferred to use a solvent such as methanol, ethanol, ethylene glycol, acetone or the like. Reaction temperatures of 80° C. to 180° C. can be used with reaction times of from 1 hour to as long as 8 hours.

In general it is preferred to use an excess of the salt of the sulfonic acid over the quantity theoretically required.

The aqueous or organic solution of the condensation product is treated with carbon dioxide in order to lower the pH from 10 to a pH corresponding to that of an aqueous carbonic acid solution generally between 6 and 7. If an organic solution is used such as in the condensation of a secondary haloalkane with the salt of the aminoalkyl sulfonic acid or with the salt of the N-substituted aminoalkyl sulfonic acid it is preferred to add a small amount of water to the organic solution in order that the carbonic acid solution can be formed.

The carbon dioxide may be added either in the form of solid carbon dioxide, that is, Dry Ice, or by bubbling gaseous carbon dioxide through the solution of the condensation product. Alternatively, the carbon dioxide may be introduced as dissolved in an aqueous solution. Sufficient carbon dioxide should be introduced in order to convert the condensation product from the salt form to the acid form. The acid form is insoluble and precipitates. This is separated from the solution by any convenient means such as by filtration and the solid is then washed with one or more portions of water to remove the impurities therefrom, i.e., adsorbed solution including sodium carbonate. The solid form is thereafter treated with a sufficient amount of base such as sodium hydroxide, potassium hydroxide, ammonia or the like to give the desired alkali metal or ammonium salt. In general it is preferred to use a slight excess of the base over the stoichiometric quantity required to convert the acid form of the condensation product back to the salt.

It has been found that carbon dioxide is unique in the process of this invention since the aqueous solution of carbonic acid produces the desired pH wherein the condensation product is converted to the insoluble acid form while leaving the impurities in a soluble form. If a stronger acid is utilized, for example, hydrochloric acid or similar highly ionized acid, the pH produced is generally 3 or below and the impurities precipitate along with the acid form of the condensation product.

It has not been found practical to add a strong acid such as hydrochloric acid in an amount exactly sufficient to give the desired pH of between 6 and 7. Strong acids would have to added dropwise and it would be necessary to know in advance the amount required to give the desired pH. If the slightest excess of such a strong acid is utilized the impurities are precipitated and it is not possible to water-wash them from the acid form of the condensation product.

The addition of the carbon dioxide to the crude solution of the salt of the condensation product is preferably carried out at room temperature. Higher temperatures are unnecessary and do not aid in the process whereas lower temperatures are likewise unnecessary since the acid form of the condensation product is insoluble at room temperature.

The following examples are provided for the purpose of further illustrating the invention and to show specific embodiments thereof. It will be understood, however, that these should not be construed as limiting.

Example I

There was obtained a $C_{14}$ to $C_{18}$ olefin fraction which contained approximately 87 to 90 percent alpha-olefins, that is, terminally unsaturated olefins and from 7 to 10 percent internally unsaturated olefins. This olefin fraction was epoxidized by reacting it with tertiary-butyl hydroperoxide admixed with approximately an equal weight of tertiary-butyl alcohol. The mole ratio of olefin to hydroperoxide was approximately 1.3:1. The reaction was carried out in the presence of a soluble molybdenum-containing catalyst obtained by reacting powdered molybdenum with tertiary-butyl hydroperoxide in the presence of tertiary-butyl alcohol in approximately equal amounts. The concentration of the molybdenum in the reaction mixture was of the order of 100 to 300 parts per million. The reaction was carried out for approximately 30 minutes at 275° F. Complete conversion of the hydroperoxide was obtained with a yield of about 85 percent epoxide.

The crude epoxidation mixture consisting of the $C_{14}$ to $C_{18}$ epoxyalkanes predominantly the 1,2-epoxyalkanes, unreacted olefin, tertiary-butyl alcohol and very minor amounts of impurities such as the catalyst was reacted with N-methyltaurine in the form of 65 weight percent aqueous sodium salt solution. The mole ratio of epoxide to N-methyltaurine was 1.1:1 and sufficient methanol was added to the N-methyltaurine solution to give a mixture consisting of 1.5 parts by weight of methanol to 1 part of water.

To 20 ml. of the crude epoxide-taurine sodium salt condensation product (approximately 4.2 grams of crude product) was added 80 ml. of distilled water to give 100 ml. of solution. This solution had a pH of 11.6. To this solution was added solid carbon dioxide (Dry Ice) until the pH dropped to 6.7. The solution was filtered and the colorless solid obtained was washed with water. The colorless solid was dissolved in sufficient 10 percent sodium hydroxide solution to dissolve the solid and give a solution having an approximate pH of 10. The colorless clear solution was oven dried and gave 4.0 grams of a colorless solid.

The filtrate which was obtained when the acid form of the condensation product was filtered was acidified with 5 N-hydrochloric acid and a tan solid was obtained. These solids after filtration were dissolved by the use of an aqueous solution of sodium hydroxide (approximately 10 percent) to give a pH of 10. After evaporation and oven drying a tan solid was obtained. This showed that the colored impurities precipitate at a lower pH and thus it is necessary to avoid such low pH levels in order to keep the impurities in solution.

A 2 gram portion of $C_{14}$ to $C_{18}$ epoxide-N-methyltaurine sodium salt condensation product was dissolved in sufficient water to give a 9 weight percent solution. This solution had a Klett color of 60 using a blue No. 42 filter and a 40 mm. cell. Klett colors are measured in the Klett-Summerson photoelectric colorimeter manufactured by the Klett Manufacturing Company, Inc., New York. A commercially acceptable color is 50–70 using a blue No. 42 filter with a nine percent solution and with a 40 millimeter cell. The Klett color of the crude condensation product before the carbon dioxide precipitation purification had a Klett color at the same concentration of 150. This shows that the process of this invention can be utilized to produce commercially acceptable products.

Example II

A large scale treatment was carried out on a sample of the same $C_{14}$ to $C_{18}$ epoxide-N-methyltaurine sodium salt of Example I. The quantity of condensation product amounted to 1440 grams in the aqueous solution. Carbon dioxide was bubbled through the solution for approximately one-half hour to precipitate the acid form of the condensation product. This was washed successively with water as described in Example I and thereafter the washed product was treated with a 10 percent sodium hydroxide solution to give a pH of 10 to the aqueous solution. After drying 1220 grams of purified solids were obtained having an acceptable Klett color as determined in Example I. The original epoxide taurine condensation product had a Klett color in excess of 150 also as determined in Example I. This example shows that large scale treatments can be carried out successfully and in addition that gaseous carbon dioxide can be employed with good results.

We claim:
1. A method for purifying aminosulfonic acid condensation products obtained by condensing an impure epoxyalkane having from 8 to 20 carbon atoms or an impure monohaloalkane having from 8 to 20 carbon atoms with an alkali metal or ammonium salt of an aminoalkyl sulfonic acid which comprises adding carbon dioxide to an aqueous solution of the salt of the condensation product to precipitate the acid form, separating the acid form from the liquid phase, washing the precipitated acid form with water to remove impurities and reconverting the acid form of the condensation product to the desired alkali metal or ammonium salt.

2. The method according to claim 1 wherein the condensation product has the formula

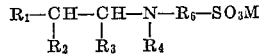

wherein $R_1$ is an alkyl radical having from 6 to 18 carbon atoms, $R_2$ is hydrogen or a hydroxyl radical, $R_3$ is hydrogen or an alkyl radical having from 1 to 12 carbon atoms, $R_4$ is a radical selected from the group consisting of an alkyl radical having from 1 to 20 carbon atoms and a radical having the formula

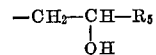

wherein $R_5$ is methyl, ethyl or propyl, $R_6$ is an alkylene radical having from 1 to 6 carbon atoms and M is ammonium or alkali metal.

3. The method according to claim 1 wherein the carbon dioxide added to the aqueous solution of the salt of the condensation product is solid carbon dioxide.

4. The method according to claim 1 wherein gaseous carbon dioxide is introduced into the aqueous solution of the salt of the condensation product.

5. The method according to claim 1 wherein the amino sulfonic acid condensation product has the formula

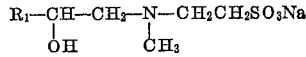

wherein $R_1$ is an alkyl group having from 6 to 18 carbon atoms.

References Cited

UNITED STATES PATENTS

| | | |
|---|---|---|
| 2,830,082 | 4/1958 | Sexton et al. |
| 2,983,712 | 5/1961 | Wilkinson. |
| 3,084,187 | 4/1963 | Gaertner. |
| 3,196,173 | 6/1965 | Willmund et al. |

DANIEL D. HORWITZ, Primary Examiner